United States Patent

Mandyam et al.

Patent Number: 5,928,334
Date of Patent: Jul. 27, 1999

[54] HARDWARE VERIFICATION TOOL FOR MULTIPROCESSORS

[75] Inventors: Sriram Mandyam; Brian Walter O'Krafka, both of Austin; Ramanathan Raghavan, Round Rock; Robert James Ramirez, New Braunfels; Miwako Tokugawa, Austin, all of Tex.

[73] Assignee: International Business Machines Corporation, Armonk, N.Y.

[21] Appl. No.: 08/827,549

[22] Filed: Mar. 28, 1997

[51] Int. Cl.$^6$ .............................. G06F 15/16; G06F 12/00
[52] U.S. Cl. ............................................. 709/248; 711/152
[58] Field of Search .............................. 395/200.78, 553; 711/163, 147, 151, 152

[56] References Cited

U.S. PATENT DOCUMENTS

| | | | |
|---|---|---|---|
| 4,772,948 | 9/1988 | Irvin | 358/139 |
| 4,780,755 | 10/1988 | Knierim | 358/10 |
| 4,821,266 | 4/1989 | Ohm et al. | 371/16 |
| 4,885,683 | 12/1989 | Coogan | 364/200 |
| 4,903,199 | 2/1990 | Keenan et al. | 364/300 |
| 5,185,745 | 2/1993 | Manca, Jr. | 371/22.3 |
| 5,185,882 | 2/1993 | White, Jr. | 364/300 |
| 5,210,861 | 5/1993 | Shimoda | 395/575 |
| 5,321,825 | 6/1994 | Song | 711/163 |
| 5,442,763 | 8/1995 | Bartfai et al. | 711/163 |
| 5,459,836 | 10/1995 | Whittaker et al. | 395/200.07 |
| 5,497,458 | 3/1996 | Finch et al. | 395/183.06 |
| 5,515,501 | 5/1996 | LaBerge et al. | 395/182.08 |
| 5,539,680 | 7/1996 | Palnitkar et al. | 364/578 |
| 5,566,319 | 10/1996 | Lenz | 711/163 |
| 5,615,373 | 3/1997 | Ho | 711/163 |
| 5,634,037 | 5/1997 | Sasaki et al. | 711/163 |
| 5,796,946 | 8/1998 | Sakon | 395/200.19 |

*Primary Examiner*—Joseph E. Palys
*Attorney, Agent, or Firm*—Volel Emile; Andrew J. Dillon

[57] ABSTRACT

One aspect of the invention relates to a method for detecting synchronization violations in a multiprocessor computer system having a memory location which controls access to a portion of memory shared by the processors, the memory location having at least one lock bit indicating whether the portion of memory is locked by one of the processors and a plurality of bits for storing a data value. The method comprises reading the memory location by an individual processor; testing the lock bit to determine whether the portion of memory is locked; if the portion of memory is not locked; asserting the lock bit to indicate the portion of memory is locked; incrementing the data value to represent a global access count; writing the lock bit and the data value back to the memory location; and incrementing a data value stored in a memory location associated with the individual processor to indicate an individual access count by the individual processor. The individual access counts for each processor are then summed and compared to the global access count to determine whether a synchronization violation has occurred.

1 Claim, 11 Drawing Sheets

```
Lock:   LARX R1, A   /* load and reserve from location A */
        CMP  R1,0    /* test if the location is not set (0) */
        BNE Lock     /* branch if already set */
        STCX 1, A    /* set (1) if the loction is not set */
        BNE Lock     /* branch if STCX fails to store */
        /* Entering Critical Section */
        ----------
        /* Exit Critical Section */

Unlock: SYNC         /* Ensure that all previous accesses are complete*/
        ST 0, A      /* clear (0) location A */
```

|  | P0 | P1 |
|---|---|---|
| FIG. 2A | ST 1,A<br>LD R1,B | ST 2,B<br>LD R1,A |

|  | P0 | P1 |
|---|---|---|
| FIG. 2B | ST 1,A<br>*Barrier*<br>LD R1,B | ST 2,B<br>*Barrier*<br>LD R1,A |

1) ST 1, A
2) ST 2, B
3) LD R1, A
4) LD R2, B
a) ST R1, A'
5) LD R1, B
6) ST 6, A
b) ST R2, B'$_{0,0}$
c) ST R1, B'$_{0,1}$
7) LD R1, A
/* postponed logging begins */
d) ST R1, A'$_{0,1}$

R1 = 0        (0-4)
R2 = 3        (3-4)
R3 = 2        (3-4)   /* Error Condition*/
R4 = 4        (4-4)

/*start saivng observed values*/

| P0 | LOP | W(0) | W(1) |
|---|---|---|---|
| | (0) | (0-3) | (4-5) - Row (0) |
| 0 | | | |
| | (0) | (0-3) | (4-5) - Row (0) |
| 2 | | | |
| | (2) | (2-3) | (4-5) - Row (2) |
| 4 | | | |
| | (4) | (3-3) | (4-5) - Row (4) |
| 3 | | | |
| | (3) | (3-3) | (5-5) - Row (3) |
| 5 | | | |
| | (5) | (6-3) | (5-5) - Row (5) |

Table entries after P0 has been checked

FIG. 10C

| | | |
|---|---|---|
| (0) | (0-3) | (4-5) |
| (1) | (1-3) | (4-5) |
| (2) | (2-3) | (4-5) |
| (3) | (3-3) | (5-5) |
| (4) | (3-3) | (4-5) |
| (5) | (6-3) | (5-5) |

FIG. 10B

| P1 | LOP | W(0) | W(1) |
|---|---|---|---|
| | (0) | (0-3) | (4-5) - Row (0) |
| 1 | | | |
| | (1) | (1-3) | (4-5) - Row (1) |
| 4 | | | |
| | (4) | (3-3) | (4-5) - Row (4) |
| 3 | | | |
| | (3) | (3-3) | (5-5) - Row (3) |
| 2 ----> (1) | | | |
| | /*Error Condition*/ | | |
| 5 | | | |
| | (5) | (6-3) | (5-5) - Row (5) |

```
Lock:   LARX R1, A   /* load and reserve from location A */
        CMP  R1,0    /* test if the location is not set (0) */
        BNE Lock     /* branch if already set */
        STCX 1, A    /* set (1) if the loction is not set */
        BNE Lock     /* branch if STCX fails to store */
        /* Entering Critical Section */
        ----------
        /* Exit Critical Section */

Unlock: SYNC         /* Ensure that all previous accesses are complete*/
        ST 0, A      /* clear (0) location A */
```

FIG. 12

```
Lock:   LARX R1, A   /* load and reserve from location A */
        TEST_LBit (R1) /*macro to test if LBit is clear (0) or set (1) */
        BNE Lock     /* branch to lock if the Lbit is set */
        ADD R2, R1, 0 /* save the value from A in R2 */
        INCREMENT_LValue(R1) /* increment Lvalue. Lvalue+=1 */
        SET_LBit(R1) /* macro to set the Lbit to 1 in a register */
        STCX 1, A    /* attempt to lock location A */
        BNE Lock     /* branch if store failed*/

/* Entering Critical Section */
        /* check if SYNC operation in last iteration worked */
        LD R3, B     /* load Lvalue from location B */
        CMP R2, R3   /* compare Lvalue from A with value from B */
        BNE SYNC_ERROR /* miscompre due to SYNC error */
        ST R1, B     /* save new value in B */
        /* save count value */
        LD R2, A"ᵢ    /* load count value for processor Pᵢ from A"ᵢ */
        ADD R2, R2, 1   /* increment count for processor Pᵢ */
        ST R2, A"ᵢ    /* save count for processor Pᵢ */
        SYNC         /* ensure updates to the critical section are visible */
        /* Exiting critical section */

Unlock: CLEAR_LBit(R1)  /* macro to clear the Lbit in a register */
        ST R1, A     /* store R1 to location A */
```

LARX R1=1, A       ST  2,  A

STCX R1,  A        LD R1=1, A /* ERROR CONDITION */
```

| P0 | P1 |
|---|---|
| Test: LD | Test: LD |
| ST | LD |
| \| | \| |

/* Sync before P0 can commence checking */

| BARRIER | BARRIER |
|---|---|
| CHECK | |

/* Sync before commencing next iteration */

BARRIER

/* Random Delay in each processor before next iteration */

| Random_Delay | Random_Delay |
|---|---|

/* Branch to next iteration if loop count is not max. */

| B Test | B Test |
|---|---|
| END | END |

FIG. 17

HARDWARE VERIFICATION TOOL FOR MULTIPROCESSORS

CROSS-REFERENCE TO RELATED PATENT APPLICATIONS

The present application is related to the following application:

METHOD AND APPARATUS FOR DETECTING COHERENCY VIOLATION ON TEST FLOOR, U.S. patent application Ser. No. 08/762,902 filed Dec. 10, 1996.

TECHNICAL FIELD

This invention relates generally to computer test systems, and more particularly to techniques for hardware verification in multiprocessor ("MP") computer systems.

BACKGROUND OF THE INVENTION

Most system designs are represented by a model written in some hardware description language ("HDL") that can be later transformed into silicon. The pre-silicon model is extensively verified through simulation before it is fabricated ("taped-out"). Since the fabrication process is very expensive, it is necessary to keep the number of tape-outs to a minimum by exposing all bugs either in simulation or in early releases of the hardware. While software simulators are slow, they permit unrestricted use of checker probes into the model-under-test. As a result, any violation exposed during simulation can be detected via the probes. On the other hand, hardware exercise programs can run at a very high speed but their checking abilities are limited to the data observed in the testcase.

Various testing methods and background information is found in A. Saha, N. Malik, J. Lin, C. Lockett and C. G. Ward, "Test floor Verification of Multiprocessor Hardware", IPCCC 1996; IBM, "PowerPC Architecture", Morgan Kaufman Publishers, 1993; L. Lamport, "How to make a multi-processor computer that correctly executes multiprocessor programs", IEEE Transaction on Computers, September 1979; W. W. Collier, "Reasoning about Parallel Architectures", Prentice-Hall Inc, 1990; Kourosh Gharachorloo, et. al, "Memory Consistency and Event Ordering in Scalable Shared-Memory Multiprocessors", Proc. 17th Annual Symposium on Computer Architecture, May 1990; Janice Stone and Robert Fitzgerald, "An Overview of Storage in PowerPC", Technical Report, IBM T. J. Watson Research Center, February 1993; A. Saha, N. Malik, B. O'krafka, J. Lin, R. Raghavan and U. Shamsi, "A Simulation Based Approach to Architectural Verification of Multiprocessor Systems", IPCCC 1995; J. T. Yen, et. al, "Overview of PowerPC 620 Multiprocessor Verification Strategy", Proc. International Test Conference, 1995; D. T. Marr, et. al, "Multiprocessor Validation of the Pentium Pro", IEEE Computer Magazine, November 1996; G. Cai, "Architectural and Multiprocessor Design Verification of the PowerPC 604 Data Cache", IPCCC 1995; and Ram Raghavan et al., "Multiprocessor System Verification through Behavioral Modeling and Simulation", IPCCC 1995. However, present methods suffer from a variety of drawbacks which will be described in greater detail herein.

Below is a set of definitions used throughout this application:

True Sharing: When two (or more) processors compete to access the same location within a cache block, the accesses are said to be true sharing. The outcome of these accesses is non-deterministic until runtime.

False-Sharing: When two (or more) processors access different locations within a cache block, the accesses are said to be false sharing. The outcome of these accesses is deterministic and can be computed a priori by sequentially running each processor's test stream on a uni-processor.

Non-Sharing: When two (or more) processors access different locations in different cache blocks, the accesses are called non-sharing accesses. The outcome of these accesses is deterministic and can be computed much the same way as the false sharing case.

Barrier: A barrier is a section of code (written using synchronization primitives) placed within each participating processor's stream. Its purpose is to ensure no participating processor continues past it until all participating processors have reached it in their respective streams. Also, when a processor reaches a barrier, all storage accesses initiated prior to the barrier must be performed with respect to all the other processors.

Every architecture defines ordering rules for storage accesses to memory locations. The most restrictive form of ordering, Sequential Consistency, limits the performance of programs by requiring all storage accesses to be strictly ordered. Several new techniques, like weak-ordering, have relaxed this requirement such that, under certain conditions, storage accesses may execute out-of-order. Any required ordering is enforced by synchronization primitives which are an integral part of these architectures.

Thus, it is important to understand some weak-ordering rules which are provided below:

Rule 1: dependent storage accesses from a processor must perform in order, and all non-dependent accesses may perform out-of-order. However, in the presence of synchronization primitives, all storage accesses initiated prior to the synchronization primitive must perform before it performs, and all storage accesses initiated after a synchronization primitive must perform after it performs. By dependent, it is meant that these accesses are to the same location (address dependency) or there is some explicit register-dependency among them.

Rule 2: accesses to the same location are said to compete with each other when at least one of them is a store operation. Competing storage accesses from different processors can perform in any order. As a result, these accesses must be made non-competing by enclosing them within critical sections which are governed by lock and unlock routines.

Rule 3: all accesses to a particular location are coherent if all stores to the same location are serialized in some order and no processor can observe any subset of those stores in a conflicting order. That is, a processor can never load a "new" value first and later load an "older" value.

A commonly used hardware exerciser is shown in FIG. 1. The hardware exerciser 100 is a program consisting of a Random Test Generator ("RTG") 102 and a simple Functional Simulator 108. It can be executed on either the hardware-under-test ("HUT") 104 or on another machine known to function correctly.

The RTG 102 produces random streams of storage access instructions for each processor in the system. Due to buffering delays, the global order of storage accesses from different processors to a particular location is non-deterministic.

Consequently, when two processors compete (as defined in Rule 2), the load operation may read the value held before the store operation or the value written by the store operation. This asynchronous nature of storage access ordering restricts the testcases generated by the RTG 102 to be false or non-shared such that the expected results are deterministic.

The Functional Simulator 108 is a simple reference model of the architecture and not the actual system. Given a multiprocessor ("MP") testcase, it computes a set of deterministic expected values. Since the storage accesses are falsed/non-shared, the expected results can be computed by sequentially executing each processor's stream on the Functional Simulator 108. After computing the expected results, the MP testcase is loaded on the HUT 104 and executed. When the testcase completes, the expected values from the Functional Simulator 108 are compared by the comparator 110 in the checker 106 with the ones obtained from the actual MP test run. If a mismatch occurs, a violation has been detected.

A variation of the above exerciser supports some restricted true sharing with the use of barriers. If two processors execute competing accesses (true sharing), the RTG 102 identifies these accesses and partitions them across barriers. In the example shown in FIG. 2A, two processors P0 and P1, compete for memory locations A and B. In FIG. 2B, the code sequence is modified so that the accesses to A and B are serialized using barriers.

If the stream between two barriers is defined as a barrier-window, only one processor is allowed to access a particular location within a barrier-window. As a result, the accesses to a location across all processors are the same as sequentially executing (in the order of the barriers) these accesses from a uni-processor system. The expected result for each location is the final value held by the location at the end of the test. A miscompare between the actual and the expected values indicates a violation in either a barrier-window or the barrier function itself.

The importance of true sharing can be understood from Rule 3. In the hardware exerciser described above, the use of barriers to accommodate true sharing restricts false, non-sharing and true sharing storage accesses to only execute within a barrier window. Consequently, bugs that may be exposed under unrestricted conditions will escape detection. In addition, lock and barrier functions themselves perform unrestricted true sharing accesses; as a result, the underlying instructions which implement these functions must be verified under unrestricted conditions.

In addition to the inability to verify true sharing accesses, the hardware exerciser shown in FIG. 1 is only able to perform checks on the values held in the various locations at the end of the testcase. Consequently, it is possible for the HUT 104 to correctly complete the testcase (correct expected values) but still contain violations that escaped detection. In order to detect these escapes, several billion cycles and sequences may have to be run such that these violations have a chance to propagate to the end of the testcase.

In weakly-ordered architectures, synchronization primitives are extensively used to implement control over accesses to shared data. The barrier function, which controls accesses to true sharing locations, is implemented using synchronization primitives. While the correct operation of the barrier function is itself a check, it is not the only mechanism to verify synchronization primitives.

SUMMARY OF THE INVENTION

One aspect of the invention relates to a method for detecting architectural violations in a multiprocessor computer system. In one embodiment, the method comprises the steps of generating a testcase instruction stream having a plurality of instructions, executable by the processors, which access a memory which is shared by the processors; detecting dependent instructions in the testcase instruction stream; and modifying the testcase instruction stream by inserting logging instructions in the testcase instruction stream which cause data associated with observable instructions to be written to a logging memory.

Another aspect of the invention relates to a method for detecting architectural violations in a multiprocessor computer system, and in another embodiment the method comprises writing a first sequence of unique values to a memory location; reading a second sequence of values from the memory location; defining a window of observable values, the window having a highest observable value and a lowest observable value; and determining whether individual values in the second sequence are within the window.

A still further aspect of the invention relates to a method for detecting synchronization violations in a multiprocessor computer system having a memory location which controls access to a portion of memory shared by the processors, the memory location having at least one lock bit indicating whether the portion of memory is locked by one of the processors and a plurality of bits for storing a data value. In one embodiment, the method comprises reading the memory location by an individual processor; testing the lock bit to determine whether the portion of memory is locked; if the portion of memory is not locked: asserting the lock bit to indicate the portion of memory is locked; incrementing the data value to represent a global access count; writing the lock bit and the data value back to the memory location; and incrementing an data value stored in a memory location associated with the individual processor to indicate an individual access count by the individual processor.

Another aspect of the invention relates to a method for detecting architectural violations in a multiprocessor computer system which executes a testcase instruction stream having a plurality of instructions which write a plurality of monotonically increasing values to a memory location and a plurality of read instructions which read from the memory location wherein segments of the testcase instruction stream are executed in parallel by individual processors in the plurality. In one embodiment, the method comprises defining a table in memory for at least one of the processors, the table having a plurality of entries which include a last observed value field and a window field, the window field having a lowest observable value and a highest observable value; and creating a new entry in the table when the at least one processor observes a new value in the memory location.

Still another aspect of the invention relates to a method for detecting architectural violations in a multiprocessor computer system. In one embodiment, the method comprises generating a testcase instruction stream having a plurality of instructions which write a plurality of monotonically increasing values to a memory location and a plurality of read instructions which read from the memory location; detecting dependent instructions in the testcase instruction stream; modifying the testcase instruction stream by inserting logging instructions in the testcase instruction stream which cause observable values of the memory location to be written to a logging memory; executing segments of the testcase instruction stream in parallel on a plurality of processors; defining a table in memory for at least one of the processors, the table having a plurality of entries which include a last observed value field and a window field, the window field having a lowest observable value and a highest observable value; and creating a new entry in the table when the at least one processor observes a new value in the memory location.

Yet a further aspect of the invention relates to an apparatus for detecting architectural violations in a multiprocessor computer system. In one embodiment, the apparatus comprises means for generating a testcase instruction stream having a plurality of instructions which write a plurality of monotonically increasing values to a memory location and a plurality of read instructions which read from the memory location; means for detecting dependent instructions in the testcase instruction stream; means for modifying the testcase instruction stream by inserting logging instructions in the testcase instruction stream which cause observable values of the memory location to be written to a logging memory; means for executing segments of the testcase instruction stream in parallel on a plurality of processors; means for defining a table in memory for at least one of the processors, the table having a plurality of entries which include a last observed value field and a window field, the window field having a lowest observable value and a highest observable value; and means for creating a new entry in the table when the at least one processor observes a new value in the memory location.

Still a further aspect of the invention relates to a method for detecting synchronization violations in a multiprocessor computer system having a memory location which controls accesses to a portion of memory shared by the processor. In one embodiment, the method comprises reading data from a memory location by an individual processor; writing the data back to the memory location; and determining whether the data is stale.

BRIEF DESCRIPTION OF THE DRAWINGS

FIGS. 2A–2B are example instruction sequences for two processors.

FIGS. 4A–4B are exemplary instruction sequences illustrating an embodiment of the invention.

FIGS. 5A–5B are exemplary instruction sequences illustrating another embodiment of the invention.

FIGS. 6A–6B are exemplary instruction sequences illustrating an embodiment of the invention.

FIG. 7 illustrates the operation of a Shrinking Window technique according to an embodiment of the invention.

FIG. 8 is an instruction sequence illustrating a further embodiment of the invention.

FIGS. 9A–9B are instruction sequences for two processors illustrating an embodiment of the invention.

FIGS. 10A–10C are tables illustrating the operation of a Shrinking Window method according to an embodiment of the invention.

FIG. 12 is an instruction sequence illustrating a memory locking system.

FIG. 13 is an instruction sequence illustrating a memory locking system according to still a further embodiment of the invention.

FIG. 17 is an instruction sequence illustrating the use of barriers according to still a further embodiment of the invention.

DETAILED DESCRIPTION OF EMBODIMENTS OF THE INVENTION

Figure 3:
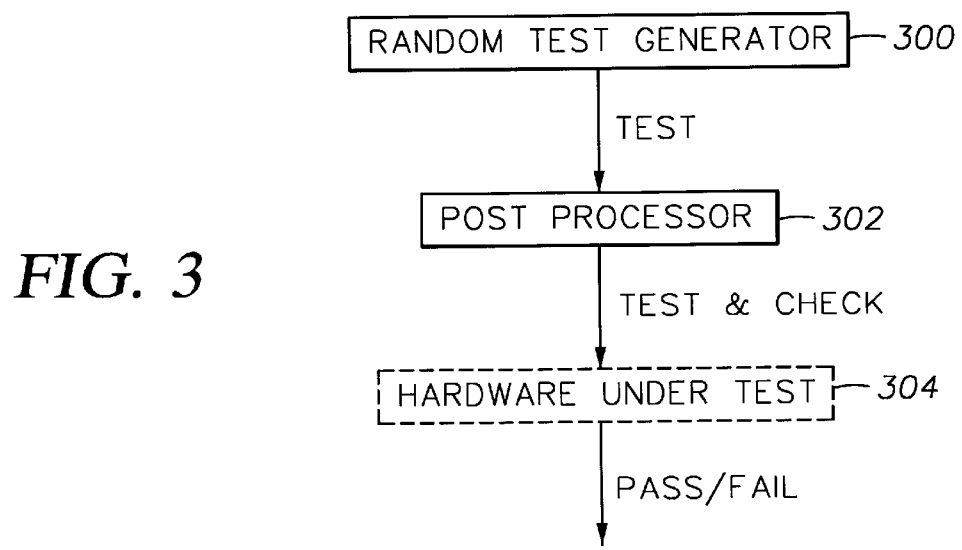
FIG. 3 is a flow diagram for a system according to an embodiment of the invention.

Referring now to FIG. 3, there is shown a testcase postprocessor according to one embodiment of the invention which converts any random test program (generated by a RTG) into a self-checking test program. As shown, the system comprises a random test generator 300 which provides random memory access instructions to a post-processor 302. After processing by post-processor 302, the modified instruction stream from random test generator 300 is provided to the hardware under test 304. The hardware under test 304 executes the modified instruction stream to determine whether there is an architectural violation in the HUT. The random test is permitted to use unrestricted true, false and non-shared accesses across multiple processors. All locations, whether they are false, true or non-shared, are checked for violations in the intermediate and final values.

Figure 1:
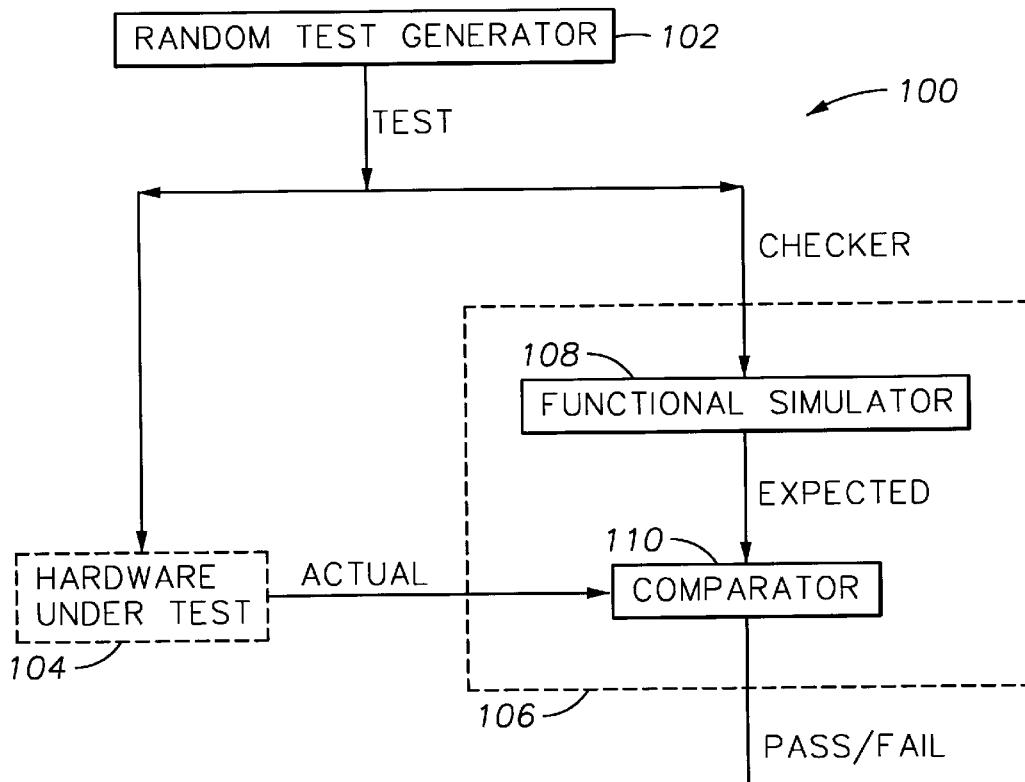
FIG. 1 is block diagram illustrating a conventional hardware checking system.

The hardware exerciser described in FIG. 1 verified that all values expected at the end of a testcase matched with actual values observed during the test-run. However, violations observable during the actual test run (through loads) are missed. One of the concerns in saving intermediate values is that the testcase will have to be modified to log (store) intermediate values after every load operation. Consequently, the randomness in the testcase may be lost due to additional log instructions around each load operation. As will be described in greater detail herein, one embodiment of the invention provides a method that solves this problem without much loss in the randomness of the testcase.

Most instruction-based hardware verification schemes rely on load operations to detect violations in storage access ordering. Each load operation in the testcase acts as an observation point for the storage access order. For any given location, the values observed by various load operations in the testcase indicate the order of stores from all processors and also the order of loads from within a processor. In Rule 1, dependency is said to exist whenever storage accesses are made to the same location, or when data is written-back to the same register (irrespective of the location). Consequently, during the actual test run, if loads are the only observation points, intermediate load values have to be saved only when there is a register-dependency condition. The remaining registers that do not have a dependency condition in the testcase can be saved at the end of the testcase.

Before proceeding with the description of the method, it is important to describe some assumptions and definitions.

Let M denote test-memory, which represents all the locations accessed in the original testcase. Then, let M' denote log-memory, which represents all the locations used to log observed values in the testcase. These memory spaces are defined such that M and M' are disjoint. Let A be a location in the test-memory space. Then, A'i,j is a location in the log-memory containing the jth observed value of A from processor Pi. From the definitions, A'0,0, A'0,1 and A'0,2 are three values of A, observed in that order from P0.

The original test stream is generated by the RTG described earlier. The stream is modified by a postprocessor using the algorithm described in this section. The modified stream contains log (store) instructions to save intermediate values of test-memory locations into the log-memory locations.

One embodiment of the method is described by the following example. FIG. 4A contains the original stream generated by the RTG 300 and FIG. 4B contains the modified random stream generated by the postprocessor 302. The original test instructions are numbered (1)–(7) in both streams, and the log instructions in the modified stream are denoted (a)–(d). In the original stream, the first dependency condition is seen in instruction (5) where, register R1 is being loaded from location B. Since instruction (3) initially loaded R1 from location A, this value of A must be saved before R1 can be reloaded. Instruction (a) in the modified stream saves the value of A into log-memory A'0,0 (this log-memory location was chosen because it is the first value of A observed by P0). After the value has been saved, instruction (5) of the original stream is permitted to load into R1.

Instruction (7) in the original stream creates the next dependency condition. Since the contents of location B were first loaded into R2, instruction (b) in the modified stream saves this value into log-memory location B'0,0 (this location was chosen because it is the first value of B observed by P0). Since location B was subsequently loaded into R1, instruction (c) in the modified stream saves this value in B'0,1. Then, instruction (7) is permitted to load into R1. Finally, the value loaded in R1 by instruction (7) is saved into log-memory A'0,1 by instruction (d) in the modified stream.

It should be noted that this example has been purposely created to describe various dependency conditions in the program. Most processors contain 32–64 general purpose registers. As a result, there are fewer dependency conditions than the ones shown in this example. The main goal of the above method is to postpone all logs to the end of the testcase unless there are dependency conditions which force intermediate logging. In the example, instruction (d) is delayed until the end.

Applying the above method, both intermediate and final values of any location can be saved into log-memory.

According to another embodiment of the invention, a method involving a "Shrinking Window" of observable values is described, wherein the observed values in the log memory locations are checked for violations. While the method will be described with reference to true sharing, both non-shared and false shared are implicitly verified.

Memory coherence refers to the order of writes to a single location. In particular, it requires all stores to a location be serialized in some order and be observed by each processor in a non-conflicting order. Since the result of a store operation from one processor is not immediately available to all other processors, the value loaded by any processor (other than the storing processor) can be one of the sequence of values written to the stored location.

The coherence rule is better explained by example. Referring to FIGS. 5A and 5B, instruction sequences are shown for processors P0 and P1, which cause storage accesses to location A in a 2-way weakly-ordered MP system. As shown, registers R1 and R2 in Processor 0 can load values 1, 2 or 4 but not 3. If Processor 0 loads the value 2 into R1, then, it can load 2 or 4, but not load 1 into R2. In addition, if Processor 0 loads 2 into R2, it can only load either 3 or 4 into R3.

The condition necessary for a coherence violation is reached when one processor observes a sequence of values to a particular location and another processor observes a conflicting sequence of values to the same location. Intraprocessor dependency violations can also cause a conflicting sequence of values to be observed. For simplicity, these two types of violations can be combined and called ordering violation.

In order to verify writes from all processors to a location are sequentially ordered, one embodiment of the invention makes use of increasing store values. If store data is unique, it is possible to verify the observed values in an interval from any processor is a subsequence of the values held by the location during that interval. The subsequence of values held during any interval can be referred to as a window. The choice of monatomic data versus random unique data will become apparent in the following examples.

In the two-processor example shown in FIGS. 6A–6B, processor P0 performs all the stores to location A, and processor P1 observes these stores with load operations from the same location. An ordering violation has occurred when one of the observed values conflicts with the order of stores to location A.

In this illustration, the observable values for location A are considered to be a window. If it assumed that the initial value of location A is 0, then the window of observable values for A is (0–4). After the test run, if the registers in P1 are R1=0, R2=3, R3=2 and R4=4. Then, if all stores to a location have to be serialized and the stores in P0 are increasing, the set of observable values at any time is represented by a "Shrinking Window". FIG. 7 is an example of how coherence is verified using the Shrinking Window.

In FIG. 7, each window in the second column indicates the state of the window after the register is loaded (after the value has been observed). When R1=0, the window remains (0–4). When R2=3, the window shrinks to (3–4). This is because all stores from P0 are ordered and increasing in value. The possible values for R3 are 3 or 4. Since R3=2, which does not lie within the corresponding window, there is a violation. A conflict is shown to exist in the order of values observed by P1.

In the example above, the algorithm used to verify access ordering requires a window consisting only of the Lowest (L) and Highest (H) observable values for the location under test. By applying the function, L<=x<=H, where x is any observed value of the location, it is possible to determine if there was a violation.

It will be recalled that, in one embodiment of the invention, a method is provided in which observed load values are saved in a log-memory location whenever a register-dependency condition was encountered. For false/non-sharing cases, if a processor did not correctly observe its own store value, the simple Functional Simulator, shown in FIG. 1, would detect it. However, when true sharing storage accesses are performed across processors, their order cannot be determined until runtime. As a result, the simple Functional Simulator can no longer be used to verify the system.

In the Shrinking Window example shown above, a simple embodiment for verifying true sharing accesses was shown. However, the verification of a MP system where more than one processor stores and loads from the same location is much more complex. This is due to the fact that the order of writes to a location from all processors is a combination of a sequence of stores from each processor and some interleaving of these sequences across processors. As a result, both loads and stores have to be logged as observed values.

FIG. 8 shows an example of efficiently saving observed values into the log-memory. For simplicity, all accesses are to the same location A.

In FIG. 8, the window of observable values for register R2 is (3—3). Consequently, it is not required to log any store that was earlier than the store of value 3. In general, for loads and stores within a processor to a particular location, only the last stored value before a load has to be logged. Thus, the method described earlier can be modified to selectively log stores based on the above condition, as will be clear to those of skill in the art.

One object of the Shrinking Window method is to construct the global order of writes to a location based on the observed values from each processor. Since each processor may only observe a subsequence of the values written to a location, it only updates the global order when it has new information about it. If at anytime there is a conflict between an observed value and the global order, an ordering violation is flagged.

The global order can be represented in a shared (m×n) table where m is the number of observable values for that location and n is the number of processors. Each row in the table represents an observable value (x) such that $0<=(x)<=m$ is always true. Given that (x) has been observed, the row for (x), row(x), contains a set of n windows where each window W(i) is a subset of observable values from a particular processor Pi. Each window W(i), contains L(i)<->H(i), where L(i) and H(i) are the lowest and highest observable values from processor Pi. It will be understood that while m values are observable, fewer than m values may be observed in a given test case. Thus, one embodiment creates a table of m rows which, except for row (0), are initially invalid. As a value is observed, its associated row is updated. If a value is not observed, then its row remains invalid. This is described in greater detail herein.

Initially, all but row(0) are invalid. Row(0) represents the initial condition of the location in the testcase. Each of the n windows in row(0) contains all observable values from the processor it represents. A Last Observed Pointer ("LOP") points to the last observed value and its row. Let (y) be the last observed value, then, LOP->(y) means "The last observed pointer is set to point at row (y)."

It is assumed that observed store and load values have been logged into the log-memory and the last observed value is (y). According to one embodiment, as each newly observed (load or store) value (x) is read from the log-memory, it is compared with each window, W(i), in row(y) by applying the function $L(i)<=(x)<=H(i)$. If (x) does not lie in any of the windows in row(y), there is an ordering violation.

If (x) lies in one of the windows of row(y), the table is checked for the presence of row(x). If row(x) is invalid, a new row(x) is created and all windows in row(y) are copied to row(x). Then, in row(x), window W(i), in which (x) lies, is updated such that L(i)=x for window W(i).

If row(x) already exists, the window W(i) in which (x) lies is updated such that L(i)=x. Then, every other window in row(x) is compared to its corresponding window in row(y). If the window in row(y) is more up-to-date (has shrunk more), the corresponding window in row(x) is replaced with it.

FIGS. 9A and 9B show a two-processor example with store values 1–5 monotonically increasing across both processors. Assume that all accesses are to the same location A. Since the initial value of location A is 0, the value is assigned to processor P0's window. This is equivalent to P0 storing a 0 into location A at the start of the test run.

The example above shows the values loaded by the various load operations into their respective registers after the test run. The values logged into log-memory from the processors are P0=(0, 2, 4, 3 & 5) and P1=(1, 4, 3, 2 & 5), respectively. Instruction 2 in P0 is not logged because it is not the last store before the load operation in instruction 4.

FIGS. 10A–10C show a table for illustrating step-by-step flow of the Shrinking Window Method according to one embodiment of the invention. FIG. 10A is a Shrinking Window table for processor P0 and FIG. 10B is a Shrinking Window table for processor P1. FIG. 10C illustrates a Shrinking Window table for processor P0 after the entries have been checked for an architectural violation. It will be understood that a two processor system has been chosen for purposes of illustration only, when the principles of the present invention could be extended to a system involving any number of processors by a person of ordinary skill in the art in view of the present disclosure. The instruction streams used by the tables shown in FIGS. 10A–10C are those illustrated in FIGS. 9A and 9B for processors P0 and P1, respectively. In FIGS. 10A and 10B, the left-most columns, P0 and P1 respectively, show the order of observed values from each processor. The row pointed by the LOP before an instruction is the last value observed before that instruction. The row pointed by the LOP after an instruction is the value observed by that instruction. The windows W(0) and W(1) indicate the next set of observable values given that a value was observed.

Initially, all but row(0) is empty and LOP->(0). The values held in row(0) are the next observable values from each processor. After each instruction, a new row in the table may be created, or, an existing row may be altered. In the example, every time a row is created or a window is modified, it is indicated in underlined bold letters.

As discussed earlier, the condition necessary for an ordering violation is satisfied when a conflicting order of values are observed by any two processors. Consequently, the checking algorithm can begin with either P0 or P1. In this example, P0 is the first processor checked. After each processor is checked, the entries in the table contain a set of observed values and the next possible values after each value are observed.

For example, let LOP->(0). With respect to the values observed by P0, instruction 1 observes the value (0) which lies in the W(0) column of row(0). Since row(0) already exists, a new row is not created. L(0)=0; as a result, the window need not be updated.

Instruction 3 observes the value (2) which lies in column W(0) of row(0). Since row(2) does not exist, it is created, and all windows are copied from row(0). Alternately, if row (2) already exists, but is invalid, then it is updated and set valid. It will be understood that since the value 1 is not observable by processor 0 in this example, row (1) is not created, or alternately, if row (1) exists in the table, it is not validated. The window in column W(0) in row(2) is updated with L(0)=2 and LOP->(2).

Instruction 4 observes the value (4) which lies in the window of column W(1) of row(2). Since row(4) does not exist, it is created, and all windows are copied from row(2). Since LOP->(2), W(0) is updated by setting L(0)=3, which is the next observable value from P0. Since L(1)=4, no update is necessary for W(1) and LOP->(4).

Instruction 5 observes the value (3) which lies in the window of column W(0), row(4). A new row is created and LOP->(3).

Instruction 6 observes the value (5) which lies in the window of column W(1), row(3). A new row(5) is created and all windows from row(3) are copied to row(5). Since LOP->(3), no more new values are observable from P0. Consequently, L(0) is set to a value such that no observed value can lie in window W(0). For example, in this case, L(0)=m+1=5+1=6 such that 6<=(x)<=3 is always false.

FIG. 10C shows a complete (6×2) table after the observed values from P0 have been checked. The LOP is reset to LOP->(0) and P1 is now checked as described with respect to FIG. 10B.

Instruction 1 observes the value (1) which lies in the window of column W(0), row(0). Since row(1) exists in the table, its columns W(0) and W(1) are compared with columns W(0) and W(1) of row(0). In one embodiment, the comparison is made by first creating a temporary row(1) (as though row(1) was invalid), copying all the windows from row(0) and setting L(0)=1 in column W(0). Then, each window in the temporary row(1) is compared to the corresponding window in actual row(1). If a window is more up-to-date in the temporary row(1), the window in actual row(1) is replaced with it. If not, as in this case, no change is necessary and LOP->(1).

Instruction 2 observes the value (4) which lies in the window of column W(1), row(1). The temporary row(4) with L(0)=2 in W(0) and actual row(4) are then created as shown. Since actual row(4) is more up-to-date, no update is required and LOP->(4).

While instruction 3 is similar to the ones described above and LOP->(3), instruction 4 observes a value (2) which does not lie in any of the windows of row(3). As demonstrated earlier, this condition satisfies the requirements for an ordering violation.

Figure 11:
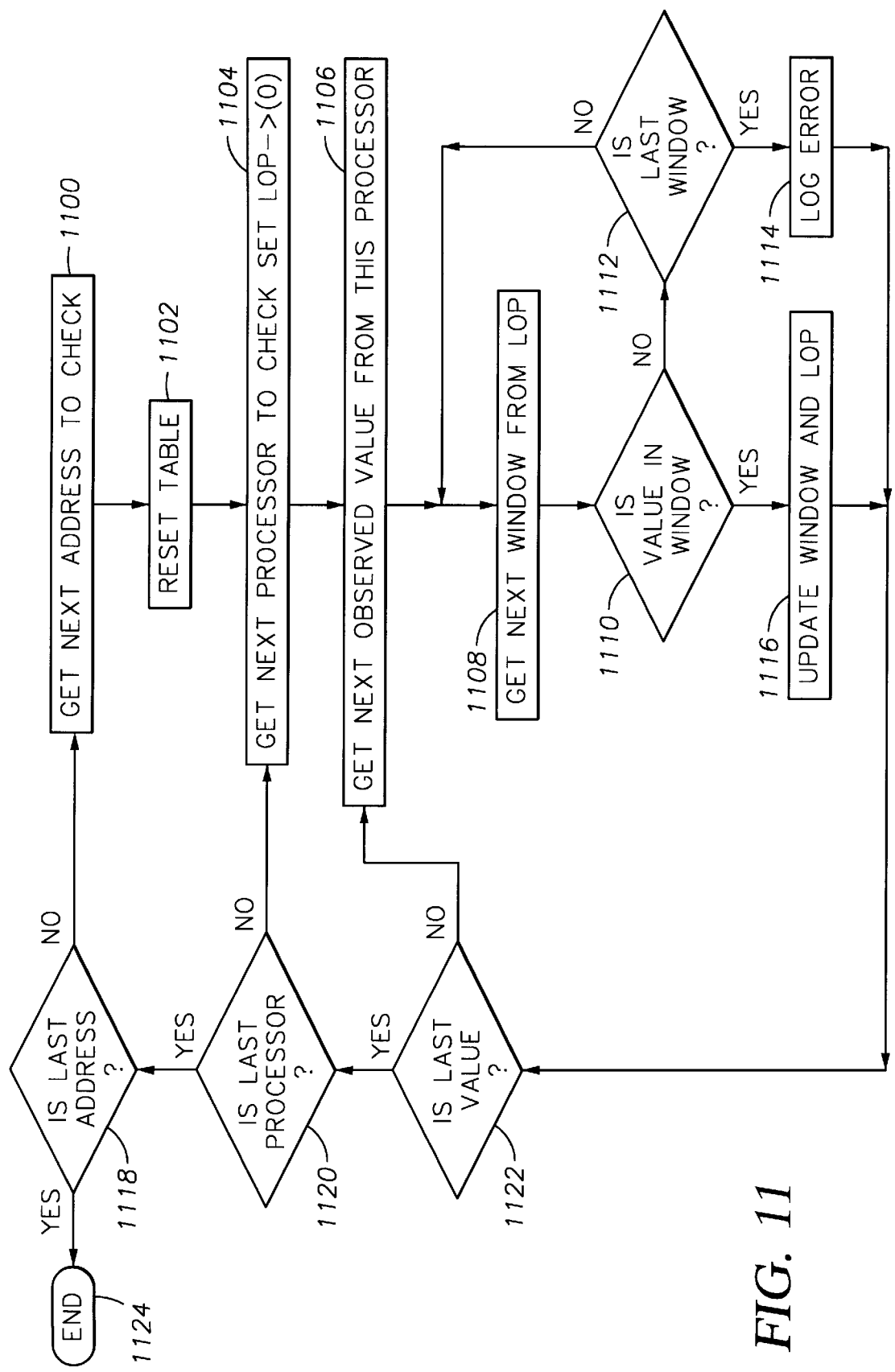
FIG. 11 is a flow chart illustrating a Shrinking Window method in one embodiment of the invention.

FIG. 11 is a flow chart showing the general flow for the Shrinking Window checking method. Initially, the method gets the first memory address to check for an architectural violation in step 1100. In step 1102, the Shrinking Window tables for each processor, such as those shown in FIG. 10A and 10B, are reset, or initialized. The system then proceeds to step 1104 where it selects the first processor of the multiprocessor system for checking and sets the corresponding last observed pointer to 0. In steps 1106 and 1108, the system then retrieves the next observed value for the processor and updates the next window from the last observed pointer. Once these values have been obtained from the table, the system proceeds to step 1110 and checks to determine whether the observed value lies within a suitable window in the table. If the value lies within the window, then the window and the LOP are updated in step 1116 and the flow proceeds to step 1122. If the value is not in the window according to step 1110, then flow proceeds to step 1112. If the window in question lies within the last row of the table, then the error is logged in step 1114 and flow again proceeds to step 1122. Otherwise, the system proceeds back to step 1108, gets the next window from the row pointed to by the LOP, then again proceeds to step 1110 as before.

In step 1122, the system checks to see if the observed value is the last observed value in the table. If not, flow proceeds to step 1106 where the next observed value is obtained from the table for the processor at issue. Flow then proceeds to step 1108 as before. If the value in question in step 1122 is the last observed value, then flow proceeds to step 1120. In step 1120, the system checks to see if there are any processor which have not been checked. If there are additional processors which have not been checked, flow proceeds to step 1104, then steps 1106–1116 are repeated for this processor. If, in step 1120, it is decided that there are no further processors to be checked, then the system proceeds to step 1118, where it obtains the next memory address to be checked. If there is another memory address to be checked, then flow proceeds to step 1100, obtains the next address, then repeats steps 1102–1116. If all values for all processors in all addresses have been checked, then the flow proceeds to step 1124 and the process is ended.

According to a further embodiment of the invention, lock and unlock routines can be checked for violations. Specifically, accesses to shared locations are made non-competing by enclosing them in critical sections with lock and unlock routines. However, the lock and unlock routines are competing accesses requiring special checks to ensure their correct operation. While unlocking a critical section can be performed by a normal instruction, such as an ordinary store operation, locking a critical section requires special instructions.

Typically, a lock routine is implemented using a Test-And-Set instruction or a routine that performs an equivalent function. In the PowerPC architecture, atomic-update primitives, such as the Load-And-Reserve ("LARX") and Store-Conditional ("STCX") instructions are used to establish a lock. These instructions perform atomic accesses to a lock-location.

The LARX instruction is a load from a word-aligned/double-word-aligned location. On performing the load operation, it establishes a reservation for a subsequent STCX operation. The STCX operation is a store to a word-aligned/double-word-aligned lock-location that is conditioned on the existence of a reservation created by a LARX. To emulate a Test-and-Set function, both operations must access the same lock-location and must be performed by the same processor.

The STCX operation stores to the target lock-location only if the lock-location accessed by the LARX has not been stored into by another processor, between the LARX and STCX operation. After a processor establishes reservation with a LARX operation, it can lose the reservation if another processor stores into the lock-location, or if it successfully performs a STCX operation.

If the STCX operation stores (or fails to store) into the target lock-location it sets a condition register in the processor indicating that it has stored (or failed to store) into the lock-location. The condition register is tested after the STCX operation to detect a successful store (or a failure to store).

FIG. 12 is an exemplary code segment for serializing accesses to a critical section according to the "PowerPC" instruction set.

The SYNC operation shown in FIG. 12 forces all storage accesses in the critical section to globally complete before the lock-location can be cleared. This ensures that subsequent accesses to the critical section will observe all previous accesses to the critical section.

A synchronization verification algorithm must ensure the correct operations of the lock and SYNC functions shown in FIG. 12. With this in mind, methods for detecting synchronization violations are described in greater detail herein.

FIG. 12 shows an MP testcase where two or more processors iteratively serialize accesses to a critical section. The total number of times the critical section was successfully entered in the testcase is the sum of the number of times each processor entered the critical section. A synchronization violation may have occurred whenever two or more processors simultaneously establish a lock. By counting the total number of times a critical section was entered in the testcase and counting each processors' successful entry into the critical section, it is possible to determine if there was a synchronization violation in the test run.

For example, if A is a word-aligned lock-location to which LARX and STCX operations are performed, then, the indivisible 32-bit location, A, can be partitioned into the following fields:

|L Value:31|LBit:1|

Assuming big-endian mode, the L Value is the first 31 bits of location A indicating the total count of successful locks at anytime during a test run. The LBit is the least significant bit of location A indicating whether the critical section is locked or unlocked.

If A"i is a location in memory where processor Pi saves the number of times it has entered the critical section, then, at the end of the test run:

L Value(A)=SUM (Count (A"0)+Count (A"1)+ . . . +Count (A"n)) Initially the lock-location A is 0. As each processor locks, it increments the L Value and sets the LBit. Inside the critical section, the count for each processor Pi is updated by incrementing location A"i. Finally, the Unlock routine clears the LBit and stores the updated L Value into lock-location A. The critical section is now free to be re-entered by any processor.

At the end of the testcase, a check is implemented wherein the count from all processors are totaled and compared against the L Value in lock-location A. If a miscompare occurs, it is probably due to a violation in the lock routine.

In the critical section, additional checks can be performed to ensure the all accesses in the previous iteration are visible in the current iteration (SYNC operation). In one embodiment, a simple scheme is implemented wherein each processor, after successfully entering the critical section, saves the value stored in the STCX operation into another location B. Whenever a processor enters a critical section, it loads from location B (ordinary load) and compares it with the value loaded from location A (LARX). If the two miscompare, it is probably due to a failure in the SYNC operation. FIG. 13 shows an example of this scheme as implemented in the "PowerPC" architecture.

The Lock Counting algorithm is a controlled and effective environment for verifying synchronization operations. However, since RTGs generate random sequences, a modified method according to the invention is applied to these sequences. While the SYNC instruction can be only verified in a controlled environment, the LARX and STCX instructions can be verified using the embodiment described below.

According to one embodiment, the lock routine in FIG. 12 is simplified to a simple Set function containing a LARX followed by a STCX sequence to the same lock-location. Such subsequences are common in any random sequence generated by RTGs. A synchronization violation has occurred when one processor sets a lock-location and another processor stores in its LARX-STCX window. Given a random sequence containing a Set function, the "Stale Value Propagation" method maximizes the chance for detecting a synchronization violation.

Stale Value Propagation is accomplished by always forcing a STCX operation to store the value loaded by its preceding LARX operation. If any other processor has stored to the same location in the meantime, the value stored by the STCX operation becomes stale. If no other processor stores to the location, the value stored by the STCX operation is still valid.

Figures 14, 15:
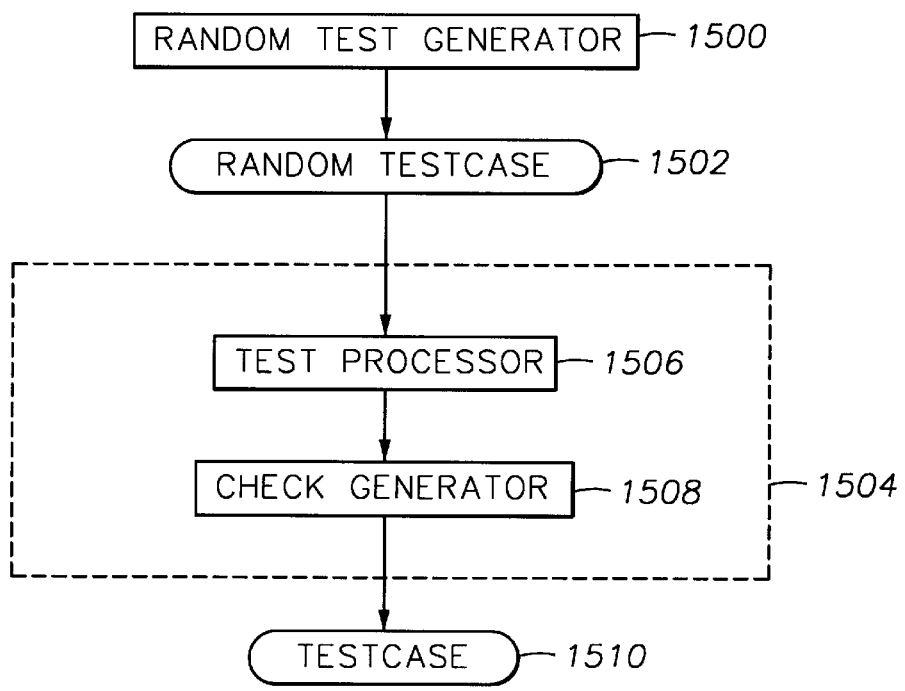
FIG. 14 is an instruction sequence illustrating the stale value propagation method according to an embodiment of the invention.
FIG. 15 is a flow diagram illustrating a test system according to an embodiment of the invention.

Consider the two-processor example in FIG. 14. As shown, processors P0 and P1 each execute a random sequence of operations to location A. The LARX operation in P0 has observed the store of (1) from P1.

If another processor performs a store to A before P0 performs the STCX operation to A, then the STCX operation should fail to store to location A. In FIG. 14, P1 stores a (2) into A before P0 can perform its STCX operation. As a result, P0's STCX should fail. In P0's STCX operation, by storing the same value loaded in the preceding LARX operation, it is possible to induce an ordering violation. After P1 stores (2) it can no longer observe a (1). However, if the STCX incorrectly succeeds, subsequent accesses to location A may observe the stale value (1). In FIG. 14, the value 2 from the second instruction will be logged according to embodiments of the invention described earlier. Therefore, the window of observable values for P1 after the second instruction will be (2—2). For P0 the window will be (0—0). Thus, P1 observes a stale value in instruction 3 by loading a (1) into register R1.

A STCX operation can never succeed without a preceding LARX operation. However, a stand-alone STCX may appear in a random sequence. According to a further embodiment, since the operation is not supposed to succeed, a known stale value can be applied to it such that it will cause an ordering violation in the Shrinking Window algorithm.

Several of the embodiments described above can be combined to provide additional functionality as shown in the system of FIG. 15. The system 1504 has two main components: a Test Processor 1506 and a Check Generator 1508. First, a random test sequence 1502 is generated by a RTG 1500. Then, the system 1504 is invoked on this test sequence which produces a modified testcase 1510. Each system component is described below.

Figure 16:
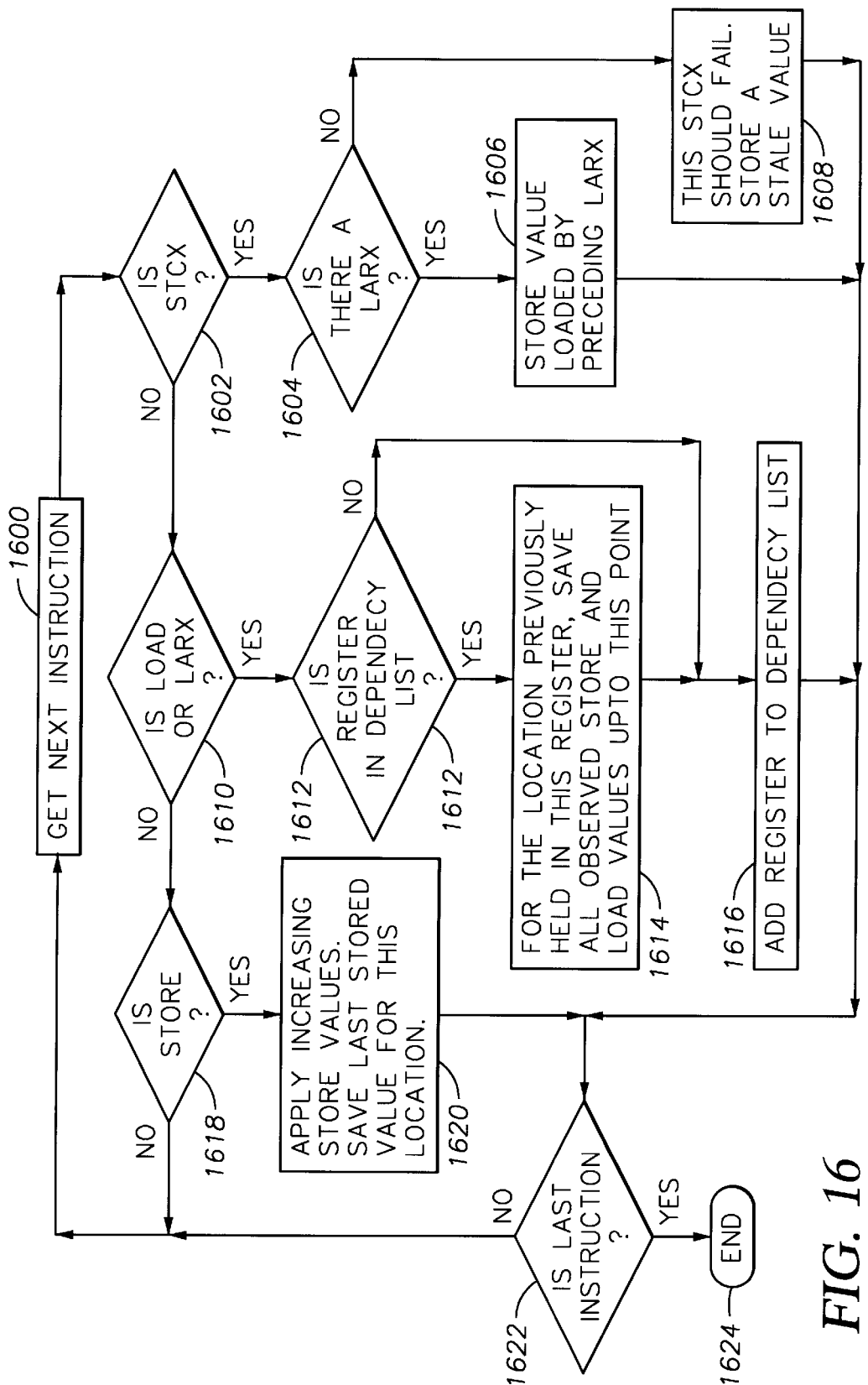
FIG. 16 is a flow chart illustrating the operation of a test processor as shown in FIG. 15.

FIG. 16 is a flow chart illustrating the operation of the Test Processor. The test processor performs several tasks. It establishes a register-dependency list per processor and saves intermediate load and store values whenever a register-dependency condition arises. Also, it applies increasing store values across all processors and propagates the last stored value from each processor whenever a register-dependency condition arises.

When a STCX instruction is encountered, the test processor checks for a preceding LARX and applies the value loaded by the LARX operation. If it is a stand-alone STCX, apply a known stale value. More specifically, referring again to FIG. 16, the test processor begins operation in step 1600. In step 1600, it gets the first instruction from the sequence generated by the RTG. It then proceeds to step 1602 to determine whether the instruction is a STCX instruction. If so, it proceeds to step 1604 where it checks to see that there is a corresponding LARX instruction. If so, it branches to step 1606 and stores the value loaded by the preceding LARX instruction. Otherwise, the STCX instruction should fail. In this case, the test processor stores a stale value in step 1608 as described earlier. If the instruction is not an STCX in step 1602, then the processor branches to step 1610 to determine whether the instruction is a load or an LARX. If so, flow branches to step 1612 where the test processor checks to see whether the register involved is in the dependency list. If so, then the observed store and load values for the memory location held by this register are logged in step 1614. Otherwise, flow branches to step 1616 where the register is added to the dependency list. If the instruction obtained in step 1600 is a store, then flow branches from step 1610 to step 1618. The flow then proceeds to step 1620, where increasing store values are generated and the last store value for the location is saved in logging memory.

If the instruction obtained in step 1600 is neither a store, a load, a LARX or a STCX, then flow simply branches back to step 1600 where the next instruction is obtained from the instruction sequence. In step 1622, the last instruction has been obtained from the instruction sequence generated by the RTG, then flow branches to step 1624 and ends.

After all the observed values have been logged, a barrier function is inserted at the end of each processor's test stream. This will ensure that all previous operations from each processor is complete before any check is performed. This is shown in greater detail by the pseudo code sequence in FIG. 17.

In this case, each test stream is iterated several times with some variations in each iteration. FIG. 17 shows an example where each processor runs the test several times. A Random_Delay function is used to skew each iteration within a processor. A second Barrier function is required to synchronize all processors before the next iteration begins.

For every location accessed in the testcase, the Shrinking Window Check function, described previously is invoked on the observed values for that location. The starting address of the observed values and the windows for each processor are passed as a parameters to the function.

Since only one processor is required to perform all the checks, the checking function is appended to the end of processor P0's stream. While processor P0 performs its checks, all other processor remain idle. This allows the MP system to self check since the architectural violations likely to occur in a MP system are not likely to be present in the individual processors.

Thus, the present invention provides techniques for the verification of coherence and synchronization operations on the HUT, with very minimal intrusion into the original test stream.

It will also be understood by those skilled in the art that the methods described herein can be applied to both simulation and hardware verification. Also, the embodiments of the invention can be implemented either as a postprocessor or can be built into any RTG. In addition, the invention can be ported to verify any weakly-ordered MP system. The embodiments described herein are given by way of example only and are not intended to be limitative. It will be understood by those of skill in the art that variations in form and detail are possible without departing from the scope and spirit of the present invention. All patents, patent applications, and other publications described herein are herebincorporated by reference as those set forth in full.

What is claimed is:

1. A method for detecting synchronization violations in a multiprocessor computer system having multiple processors and a memory location which controls access to a portion of memory shared by the multiple processors, the memory location having at least one lock bit indicating whether the portion of memory is locked by one of the multiple processors and a plurality of bits for storing a data value, the method comprising the steps of:

reading the memory location by an individual processor;

testing the lock bit to determine whether the portion of memory is locked;

if the portion of memory is not locked:

asserting the lock bit to indicate the portion of memory is locked;

incrementing the data value to represent a global access count;

writing the lock bit and the data value back to the memory location; and incrementing a data value stored in a memory location associated with the individual processor to indicate an individual access count by the individual processor;

summing a plurality of individual access counts created by a plurality of individual processors; and comparing the sum of the plurality of individual access counts with the global access count to determine whether a synchronization violation has occurred.

* * * * *

UNITED STATES PATENT AND TRADEMARK OFFICE
CERTIFICATE OF CORRECTION

PATENT NO. : 5,928,334
DATED : July 27, 1999
INVENTOR(S) : Mandyam et al.

It is certified that error appears in the above-identified patent and that said Letters Patent is hereby corrected as shown below:

Page 16, Line 5 delete "tions." and replace with --tions,--;

Page 16, Line 5 delete "herebin-" and replace with --hereby--; and

Page 16, Line 6 delete "corporated" and replace with --incorporated--.

Signed and Sealed this

Third Day of April, 2001

Attest:

NICHOLAS P. GODICI

*Attesting Officer*     *Acting Director of the United States Patent and Trademark Office*